United States Patent [19]

Cardinali

[11] Patent Number: 5,297,947
[45] Date of Patent: Mar. 29, 1994

[54] ROTARY DIE MOULDING INSERT SYSTEM

[75] Inventor: Joseph Cardinali, Millington, N.J.

[73] Assignee: Tiefenthaler Machinery Co., Inc., Brookfield, Wis.

[21] Appl. No.: 878,558

[22] Filed: May 5, 1992

[51] Int. Cl.$^5$ .............................................. B29C 43/06
[52] U.S. Cl. ................................. 425/194; 425/335; 425/362; 425/363
[58] Field of Search ............... 264/175; 425/182, 194, 425/241, 328, 335, 362, 363, DIG. 235

[56] References Cited

U.S. PATENT DOCUMENTS

| | | | |
|---|---|---|---|
| 1,357,141 | 10/1920 | Bibb | 425/194 |
| 2,081,724 | 5/1937 | Abbott | 425/194 |
| 2,233,688 | 3/1941 | Weidenmiller | 425/194 |
| 3,205,837 | 9/1965 | Fay | 425/362 |
| 3,302,592 | 2/1967 | Werner | 425/362 |
| 4,261,692 | 4/1981 | Kuby | 425/194 |

FOREIGN PATENT DOCUMENTS 563683  12/1923  France ................. 425/362

OTHER PUBLICATIONS

*Biscuit and Cracker Handbook*, Chapter 12, "Rotary Machine Cookies", pp. 97–103.

Weidenmiller Company, *Rotary Molders*, two-page brochure, 1986.
Weidenmiller Company, *Rotary Molders*, four-page brochure.

*Primary Examiner*—Charles S. Bushey
*Attorney, Agent, or Firm*—Nilles & Nilles

[57] ABSTRACT

A rotary die moulding machine used in the commercial production of baked goods, which includes plastic inserts for the moulding cavities on the die roll, is disclosed. Each moulding cavity is formed as a bore with a first wall section extending inwardly from the outer surface of the die roll a depth corresponding to the desired thickness of the baked good being moulded, and a second wall section with an undercut edge beneath the first wall section. The plastic insert has a face portion with a designed face for imprinting a design into the dough, and has a base portion with a protruding edge which conforms to the undercut edge of the second wall section. The plastic insert fits snugly by snap action into the moulding cavity. The plastic insert further provides improved release of bakery dough. The plastic insert and the moulding cavity may be modified to accommodate different shapes, thicknesses and designs of commercially produced cookies, biscuits and other baked goods.

5 Claims, 2 Drawing Sheets

ROTARY DIE MOULDING INSERT SYSTEM

BACKGROUND OF THE INVENTION

1. Field of the Invention

This invention relates to a rotary die moulding machine, and in particular to a plastic insert or wafer on a die roll of a rotary die moulding machine used for making cookies, biscuits and other baked goods.

2. Background of the Related Technology

Commercial bakeries typically produce baked goods like cookies and biscuits on a conveyor line or production line on which the goods are moulded and baked on a conveyor system. One known and often used device for moulding bakery dough is a rotary die moulding machine. The machine force feeds the dough into an engraved cavity on a die roll to mould it with the desired shape, thickness and design, and then removes the moulded dough blank from the die roll and transfers it to a conveyor oven.

On the rotary die moulding machine, bakery dough is introduced between a forcing roll and the die roll. The die roll, which is the heart of the rotary die moulding machine, is a long metal cylinder which extends across the width of the conveyor. The die roll, normally made from bronze, may be one piece or made in sections and it has engraved into its outer surface a number of cavities in the shape and design of the baked good to be moulded. The dough is forced into the engraved cavities on the die roll thereby moulding the dough into the desired shape and thickness and imprinting it with a design. Excess dough is trimmed with a shear knife. The moulded dough blank is then extracted from the cavity by pressing it against a fabric extraction web which releases it from the die and then transfers it to an intermediate web for deposit onto a baking band and into an oven for baking.

Sandwich cookies such as OREOS ® are commonly produced by this process. Rotary die moulding machines are used to make a wide variety of shapes, designs and thicknesses of baked goods.

Despite being widely accepted by high production commercial bakeries, rotary die moulding machines have a number of disadvantages and objectionable features. The engraved design in the cavity may become roughened or slightly pitted due to the action of soda or ammonia and other ingredients in the dough or by foreign objects inadvertently introduced into the machine. Furthermore, bakery dough has a tendency to stick to particularly intricate designs engraved into the cavity. For these reasons the dough blank occasionally does not release well from the cavity in the die roll, causing an accumulation of dough and greatly reducing the definition of the detailed engraving imprinted on the baked product. This results in difficulty in maintaining the specified weight of the baked product as well as objectionable visual blemishes on the surface.

TEFLON ® or other nonstick surface treatments have been applied to die rolls in an effort to improve release characteristics. Nonstick coatings, however, wear off, especially when rougher types of bakery dough are used. Reapplication of a nonstick coating is possible, but reapplication requires removal of all the old coating. Removal and reapplication of coatings requires that the die roll, shaft, and hubs be completely disassembled, thoroughly cleaned by blasting with glass beads, cavities de-burred, coated, heat treated, excess coating on the outer surface of the die roll removed and re-assembled. This process typically takes the die roll out of service two to three weeks, and costs 12 to 15 percent of the cost of a new die.

An engraved die roll is also expensive to make, and, if only one of the engraved cavities becomes disfigured, replacement of the entire die roll may be required. In an effort to reduce cost, one known system provides a replaceable metal insert for the die cavities, depicted in FIG. 8 of the drawings. On this known system, the die roll cavity is formed as a simple bore with straight sides. The metal insert is placed into the cavity and, from within the center of the die roll, bolted into the bore. In the event a foreign object disfigures the designed face on a particular metal insert, the metal insert may be replaced. However, replacement of the metal insert requires an extensive amount of labor to access the center of the roll to unbolt the insert and install a new one. After replacing the insert(s), the die surface must then be machined on a lathe to ensure that the new inserts are at the same surface level as the others, which may be different because of wear. Further, bakery dough and shortening have a tendency to be forced into the crevice between the bore wall of the cavity and the side of the insert, which is extremely difficult to remove and causes a sanitary problem.

SUMMARY OF THE INVENTION

A plastic rotary die moulding insert system for moulding bakery dough to make cookies, biscuits and other baked goods is disclosed. The system includes a bore or moulding cavity in a rotary die roll with an undercut edge, and a plastic wafer or insert snugly snapped into place in the cavity. The plastic insert has a design on its face for imprinting the design on the bakery dough.

The plastic insert provides a die roll with excellent release characteristics for bakery dough. In the event the design on the face of the plastic insert becomes disfigured or worn, the plastic insert can be easily removed and replaced without having to disassemble the die. The undercut edge of the moulding cavity firmly locks the plastic insert in place. Because of the undercut edge, dough does not collect in the crevice between the side of the insert and the wall of the moulding cavity. Plastic inserts may be installed on the die roll under normal room temperatures, so the die roll is not subject to the cost or lost time involved with applied coatings. The plastic inserts also tolerate the temperatures encountered in cleaning operations for sanitation purposes.

The plastic insert can be either of constant thickness, with the moulding cavity milled out parallel to the outer surface of the die roll and the undercut following the same contour, or the bottom of the cavity can be flat, with the plastic insert having a variable thickness to make up the difference. The effect is the same; the machining cost or the size of the cavity will dictate which method to use in each instance.

The primary objects of the invention are therefore to provide a rotary die moulding insert system which includes a plastic insert in the moulding cavity of the die roll; to provide a plastic insert for the moulding cavity of the die roll which has improved release characteristics for bakery dough over an engraved metal cavity; to provide a plastic insert which is easily replaceable when worn or damaged; to provide a plastic insert which easily and snugly snaps into the moulding cavity of a die roll; to provide the moulding cavity of the die roll with an undercut edge to prevent dough from collecting in the crevice between the insert and the cavity wall; to provide a plastic insert for a die roll which tolerates normal operating temperatures and cleaning temperatures; to provide a rotary die moulding insert system which is adaptable for making baked goods having a wide range of shapes, designs and thicknesses.

Other objects and advantages of the invention will become apparent from the following description which, in connection with the accompanying drawings, sets forth by way of illustration and example certain embodiments of the invention.

BRIEF DESCRIPTION OF THE DRAWINGS

The drawings, which constitute a part of this specification and include exemplary embodiments of the invention, include the following.

DETAILED DESCRIPTION

On a rotary die moulding machine used in the commercial production of cookies, biscuits and other baked goods, bakery dough is introduced between a forcing roll FR and die roll 10. The dough is forced into moulding cavities 12 on the die roll 10 at which point the dough is moulded into the desired shape and thickness and imprinted with a design. Excess dough is trimmed by shear knife K. The dough blanks are extracted from the moulding cavities 12 by extraction web EW and transferred to intermediate web IW for baking.

Figure 2:
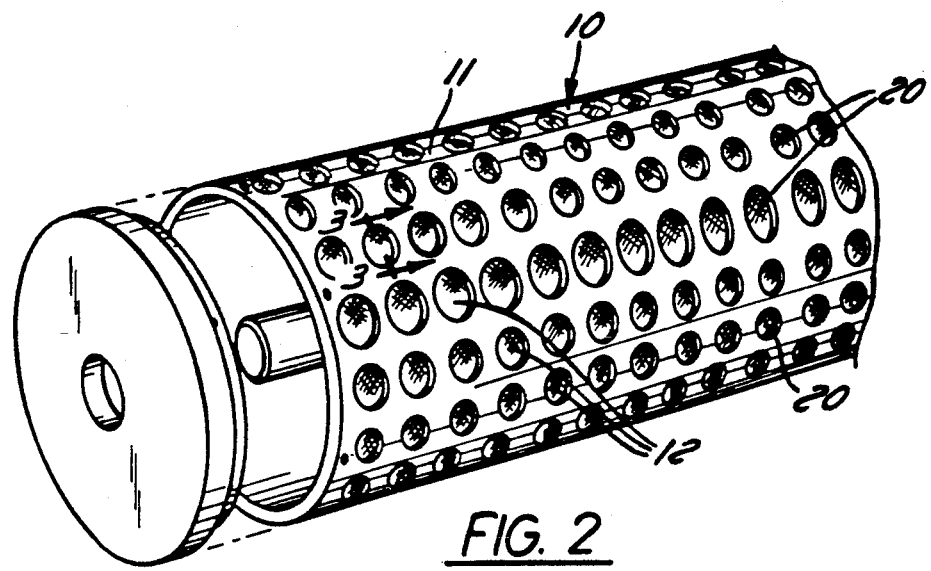
FIG. 2 is an isometric drawing of a die roll for a rotary die moulding machine.

The die roll 10 is a long cylindrical shell extending across the width of the extraction web EW. The die roll 10 may be made of aluminum or bronze, and the die roll may be made in one piece as shown in FIG. 2, or made in sections. The moulding cavities 12 are bored or milled at numerous locations into the outer surface 11 of the cylindrical die roll 10.

Each moulding cavity 12 on the die roll 10 is machined to snugly hold a complementary plastic insert 20. In general, each moulding cavity 12 is machined with a bottom surface 13, a first wall section 14, and a second wall section 15 with an undercut edge 16. The first wall section 14 is machined at an angle, usually about fifteen degrees (15°), from the perpendicular to the outer surface 11 of the die roll 10. This angle, which is maintained at each point around the perimeter of the moulding cavity 12, allows the dough blanks to be easily extracted from the moulding cavity without distortion. The second wall section 15 is machined with an undercut edge 16 beneath the first wall section 14. Further, the bottom edge of the second wall section 15 is machined down to the same level as the bottom surface 13. The complimentary plastic insert 20 has a shape and dimensions corresponding to those of the first and second wall sections, 14 and 15, respectively. When the plastic insert 20 is inserted into the moulding cavity 12, the plastic wafer 20 fits and seals in the space formed by the second wall section 15 and the undercut edge 16.

Figure 1:
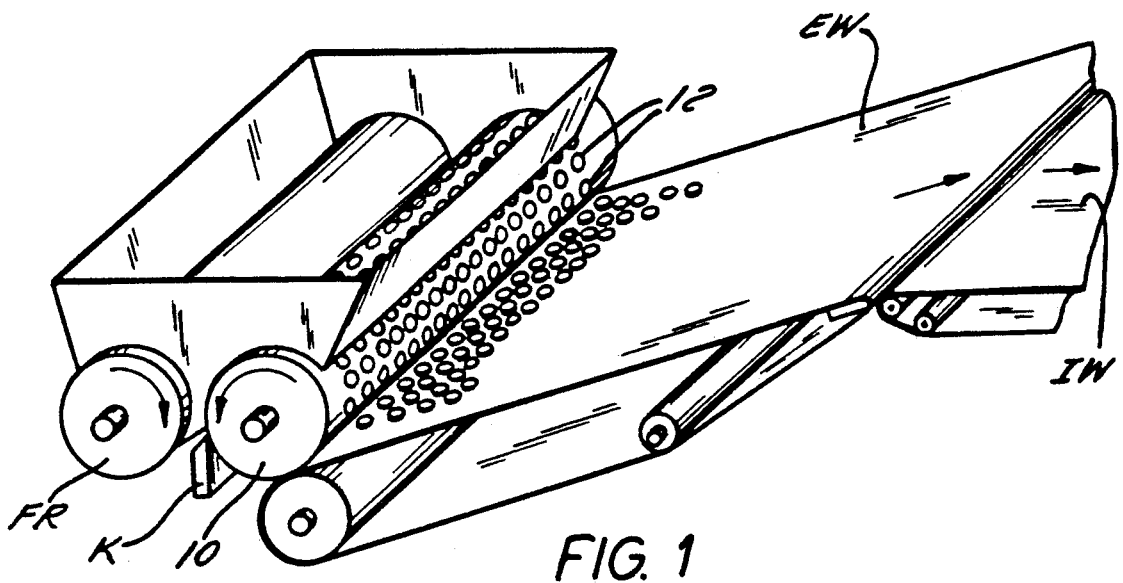
FIG. 1 is an isometric drawing of the essential features of a rotary die moulding machine.
Figure 7:
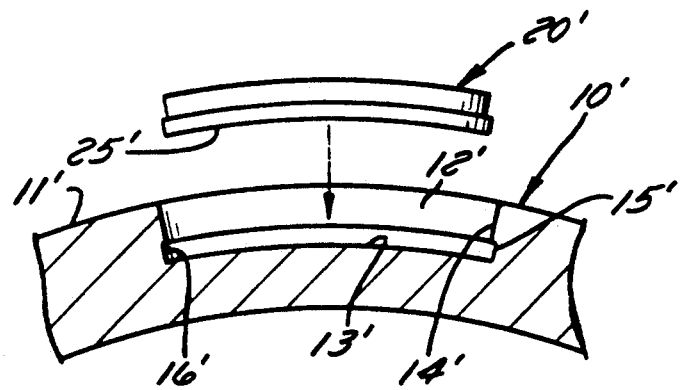
FIG. 7 is comparable to FIG. 3 but shows a second embodiment of the invention wherein the moulding cavity is formed with a curved bottom surface and showing a curved, constant thickness plastic insert.
Figure 8:
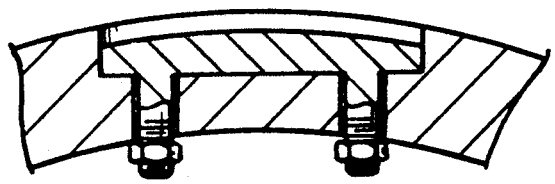
FIG. 8 is a view of the prior art insert system discussed above.

FIGS. 3–6 show a first embodiment of the insert system wherein the bottom surface 13 of the molding cavity 1 is machined flat and the plastic insert 20 varies in thickness. A second embodiment is shown in FIG. 7 in which the bottom surface 13' is machined to a constant depth relative to the outer surface of the die roll 10' and the plastic insert 20' has a constant thickness. The specific details of the first and second embodiments are described below.

Figure 3:
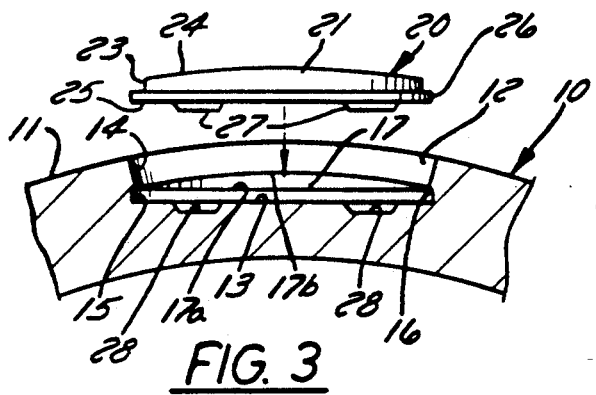
FIG. 3 is a cross-section view of the die roll taken at line 3—3 of FIG. 2 and a side view of a plastic insert prior to insertion into moulding cavity in the die roll.
Figure 5:
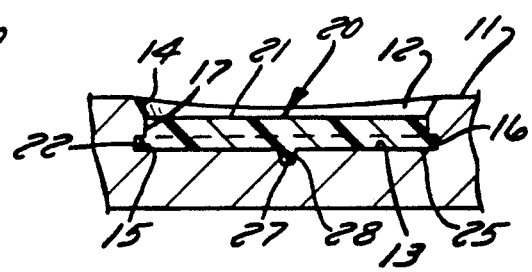
FIG. 5 is a cross-section view of the die roll and plastic insert taken at line 5—5 of FIG. 4.
Figure 4:
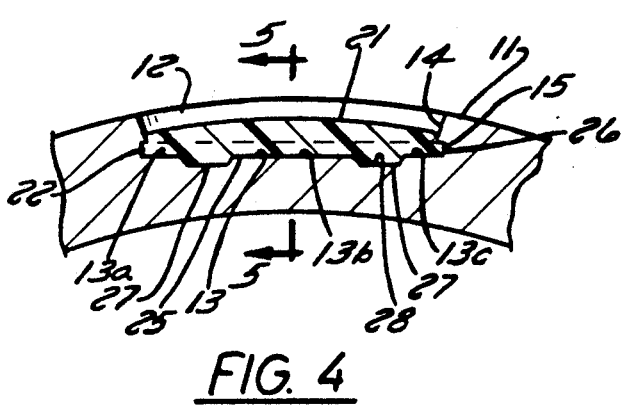
FIG. 4 is also a cross-section view of the die roll with the plastic insert in place within the moulding cavity.
Figure 6:
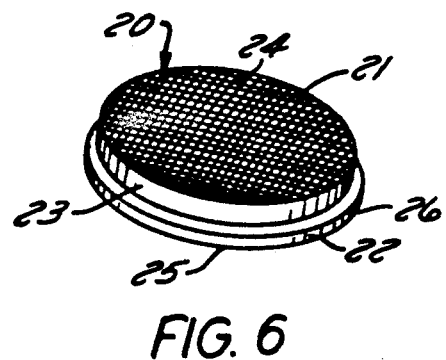
FIG. 6 is a perspective view of the plastic insert for the die roll.

In the first embodiment shown in FIGS. 3–6, each moulding cavity 12 is machined to form a flat bottom surface 13, a first wall section 14 and a second wall section 15. The first wall section 14 of the moulding cavity 12 extends from the outer surface 11 of the die roll 10 inwardly to a depth corresponding to the desired thickness of the baked good being moulded. The first wall section 14 is also machined to a shape corresponding to the desired shape (e.g. circle, rectangle, etc.) of the baked good being moulded. The second wall section 15 extends further inwardly to the flat bottom surface 13. Further, the second wall section 15 has an undercut edge 16 beneath the first wall section 14. In other words, the moulding cavity 12 is machined so that the first wall section 14 overhangs the second wall section 15, as shown in FIGS. 3, 4 and 5.

Looking at FIGS. 3 and 4, the bottom surface 13 of the moulding cavity 12 is flat while the outer surface 11 of the cylindrical die roll 10 is arcuate or curved. The distance between the flat bottom surface 13 and the curved outer surface 11 therefore changes depending on where the distance is measured. In other words, the distance between the curved outer surface 11 of the die roll 10 and peripheral areas 13a and 13c of the flat bottom surface 13 is less than the distance between the curved outer surface 11 of the die roll and the middle area 13b of the flat bottom surface 13. This results in having the first wall section 14 meet the undercut edge 16 of the second wall section 15 above peripheral areas 13a and 13c of the flat bottom surface 13. At middle area 13b of the cavity 12, where the first wall section 14 and second wall section 15 do not meet due to the curvature of the outer surface 11 of the die roll 10, an intermediate wall section 17 extends from the first wall section 14 inwardly to the undercut edge 16 of the second wall section 15.

Since the inner edge 17a of the intermediate wall section 17 is formed by the undercut edge 16 of the second wall section 15, the inner edge 17a of the intermediate wall section 17 is parallel to the flat bottom surface 13 of the moulding cavity 12. Since the outer edge 17b of the intermediate wall section 17 is formed by the lower edge of the first wall section, the outer edge 17b of the intermediate wall section 17 is therefore concentrically curved relative to the outer surface 11 of the die roll 10.

The system further includes a plastic insert or wafer 20 which fits snugly within the moulding cavity 12. The plastic insert 20, shown in FIG. 6, has an outer face portion 21 and an inner base portion 22. The outer face portion 21 is formed with a perimeter edge 23 in a shape (e.g. circle, rectangle, etc.) which corresponds to the shape of the baked goods to be moulded, which in turn corresponds to the shape of the first wall section 14 of the moulding cavity 12. The outer face portion 21 of the plastic insert 20 further has a designed surface 24 for imprinting a design into the bakery dough. The designed surface 24 is also concentrically curved relative to the outer surface 11 of the die roll 10 and t the inner edge of the first wall section 15 of the moulding cavity 12. When the plastic insert 20 is placed within the moulding cavity 12, the design surface 24 is therefore displaced a constant distance from the outer surface 11 of the cylindrical die roll 10. As forcing roll FR presses the bakery dough into the moulding cavity 12 on the rotating die roll 10, the dough blank is thus moulded to a uniform thickness.

The inner base portion 22 of the plastic insert 20 comprises a disk-like section having a flat base surface 25 and an edge 26 protruding slightly outward relative to the perimeter edge 23 of the outer face portion 21. When the plastic insert 20 is inserted into the moulding cavity 12, the flat base surface 25 rests against the complementary flat bottom surface 13 of the moulding cavity 12. The shape of the protruding edge 26 of the base portion 22 on the plastic insert 20 corresponds to the shape of the undercut edge 16 of the second wall section 15 of the moulding cavity 12 which snugly holds the plastic insert 20 in place.

The plastic insert 20 is preferably made from a sufficiently resilient material and dimensioned so that it may be forced and snapped into the moulding cavity 12. The plastic insert 20 must fit within the moulding cavity 12 snugly or tightly enough to inhibit dough from forcing itself into the crevice between the edge of the plastic insert 20 and the wall of the moulding cavity 12. The plastic insert 20 may be made from a nylon and TEFLON ® based material called DELRIN ® by DuPont or from any other FDA approved material which provides sufficient resiliency t allow the insert 20 to be snapped into and held tightly in the moulding cavity 12 on the die roll 10 and provides the desired release characteristics for dough blanks.

The production of round cookies requires both the moulding cavity 12 and the plastic insert 20 to be round, as shown in the drawings. To ensure proper orientation of the plastic insert in the moulding cavity 12, the base portion 22 of the plastic insert 20 may be provided with a location tab 27, or a pair of tabs as shown, which fits into a complimentary location recess 28 in the moulding cavity 12.

In the second embodiment shown in FIG. 7, the bottom surface 13', the second wall section 15' and the undercut edge 16' are concentrically curved relative to the outer surface 11' of the die roll 10'. The plastic insert 20', in this case, has a constant thickness. The plastic insert 20' may be formed with a curve to fit into the curved moulding cavity 12', or in some applications the plastic insert 20' may be originally formed flat and then as the insert is forced into the curved moulding cavity 12' the resilient plastic material allows it to conform to the curved surfaces of the cavity 12'.

Although the drawings show an insert system for a round sandwich cookie, the system may be modified using the principles disclosed above to produce cookies shaped like rectangles, stars, ovals, peanuts, animals, windmills, and nearly every other shape of commercially produced baked goods currently on the market.

The system may also be modified to produce baked goods having a wide range of thicknesses and imprinted with designs to depict letters, numbers, ridges, swirls, insignias, and so on.

Therefore, specific structural and functional details disclosed herein are not to be interpreted as limiting, but merely as a basis for the claims and for teaching on skilled in the art to variously employ the present invention in any appropriately detailed structure. Changes may be made in the details of construction, arrangement and operation of the invention without departing from the spirit of the invention, especially as defined in the following claims.

I claim as my invention:

1. A rotary die moulding machine for moulding bakery dough for baked goods comprising:
   a die roll having a curved outer surface with a plurality of moulding cavities therein;
   each moulding cavity having a first wall section with a shape and depth corresponding to a shape and thickness of the baked goods to be moulded, respectively, and having a second wall section with an under cut edge beneath the first wall section, and having a flat bottom surface, whereby the first wall section meets the undercut edge at first and second peripheral areas of the cavity, and in a middle area of the cavity an intermediate wall section extends from the first wall section inwardly to the undercut edge of the second wall section;
   plastic inserts snugly insertable into the moulding cavities for imprinting designs into the bakery dough with each insert comprising:
   a face portion having a shape corresponding to the shape of the first wall section of the moulding cavity;
   a base portion having a shape corresponding to the shape of the undercut edge of the second wall section of the moulding cavity, and the base portion having a flat base surface complementary to the flat bottom surface of the mounding cavity; and
   a designed surface on the face portion of the insert with a design to be imprinted into the baked goods and the designed surface being concentrically curved relative to the outer surface of the die roll thereby forming a space for moulding the bakery dough to a uniform thickness.

2. The rotary die moulding machine according to claim 1,
   wherein the first wall section is machined at an angle of about fifteen degrees (15°) from the perpendicular of the outer surface of the die roll at each point around the perimeter of the moulding cavity.

3. A die roll for a rotary die moulding machine used to mould bakery dough for baked goods comprising:
   a metal cylinder having a plurality of moulding cavities on a curved outer surface thereof, with each moulding cavity having a first wall section with a depth and shape corresponding to a thickness and shape, respectively, of the baked goods to be moulded, and a second wall section having an undercut edge beneath the first wall section, the first wall section meeting the undercut edge at first and second peripheral areas of the cavity, and an intermediate wall section extending from the first wall section to the second wall section in the middle area of the cavity;
   plastic inserts snugly within the moulding cavities, with each insert comprising:

a face portion having a shape corresponding to the shape of the first wall section of the moulding cavity;

a base portion having a shape corresponding to the shape of the undercut edge of the second wall section of the moulding cavity;

a designed surface on the face portion of the insert concentrically curved relative to the outer surface of the metal cylinder thereby forming a space for moulding the bakery dough and having a design to be imprinted into the baked goods; and each insert being made from an integrally molded plastic material sufficiently resilient to be snappably insertable into the moulding cavities and to seal against the first and second wall sections thereof.

4. The die roll according to claim 3, wherein the base portion of the insert includes a flat base surface which rests against a complimentary flat bottom surface of the moulding cavity.

5. The die roll according to claim 3, further comprising a location tab on the base portion of the insert which fits into a complimentary location recess in the moulding cavity of the die roll.

* * * * *